(12) United States Patent
Conway, Jr. et al.

(10) Patent No.: US 6,536,711 B1
(45) Date of Patent: Mar. 25, 2003

(54) SINGLE APERTURE CONFORMAL AIRCRAFT BAYS

(75) Inventors: George Louis Conway, Jr., Fort Worth, TX (US); Kendall G. Young, Crowley, TX (US); Ron L. Stroud, Benbrook, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/965,310

(22) Filed: Sep. 27, 2001

Related U.S. Application Data
(60) Provisional application No. 60/241,507, filed on Oct. 18, 2000.

(51) Int. Cl.[7] .................................................. B64D 1/06
(52) U.S. Cl. ................................. 244/129.5; 244/137.1
(58) Field of Search ........................... 244/118.1, 129.4, 244/129.5, 131, 132, 137.1

(56) References Cited

U.S. PATENT DOCUMENTS

| | | | |
|---|---|---|---|
| 4,220,298 A | * | 9/1980 | Willis ..................... 244/129.5 |
| 5,222,699 A | | 6/1993 | Albach et al. ............... 244/213 |
| 5,794,893 A | | 8/1998 | Diller et al. ................. 246/213 |
| 5,803,405 A | | 9/1998 | Ellis et al. .................... 244/130 |
| 5,810,291 A | | 9/1998 | Geiger et al. ................ 244/133 |
| 5,845,877 A | | 12/1998 | Justice et al. ............... 244/131 |
| 5,845,879 A | | 12/1998 | Jensen ......................... 244/135 |
| 5,975,463 A | | 11/1999 | Gruensfelder et al. .... 244/118.1 |
| 5,979,828 A | | 11/1999 | Gruensfelder et al. .... 244/129.1 |
| 5,988,567 A | | 11/1999 | Wille ....................... 244/129.5 |
| 6,059,230 A | * | 5/2000 | Leggett et al. ............ 244/129.5 |
| 6,068,215 A | | 5/2000 | Gruensfelder et al. .... 244/129.5 |
| 6,079,667 A | | 6/2000 | Gruensfelder ................ 244/53 |
| 6,098,925 A | | 8/2000 | Burdsall, II et al. ...... 244/118.1 |
| 6,145,791 A | | 11/2000 | Diller et al. ................. 244/215 |

* cited by examiner

*Primary Examiner*—Robert P. Swiatek
(74) *Attorney, Agent, or Firm*—Bracewell & Patterson, L.L.P.

(57) ABSTRACT

A conformal aircraft bay having a single aperture or gap formed by doors with abutting edge portions being located side-by-side while the doors are in a closed position, the doors are structured to open to access the bay with the abutting edge portions moving apart from each other, and each door having an elastomeric transition closing the gaps between the abutting edge portions when the doors are closed.

20 Claims, 9 Drawing Sheets

FIG. 13

SINGLE APERTURE CONFORMAL AIRCRAFT BAYS

This application claims the benefit of Applicant's copending U.S. provisional application, Serial No. 60/241,507, filed on Oct. 18, 2000.

FIELD OF THE INVENTION

The present invention relates in general to an improved aircraft structure, and more particularly to a conformal aircraft bay having a single aperture or gap between bay doors.

BACKGROUND OF THE INVENTION

Modern aircraft are designed to carry a payload in the fuselage of the aircraft. Such payloads include weapons, landing gear, and cargo. Aircraft bays and their components are designed so as to minimize their impact on aircraft performance. To reduce aerodynamic drag and maximize performance, there is a need to design aircraft bays to have a conformal or aerodynamic shape.

Aircraft bays have a number of exterior access doors such as for weapons bay, landing gears, and avionics access. These doors form gaps or apertures with aircraft skin elements that are located between adjacent door panels and between the doors and fixed skins that surround their associated bay hinge. Gaps occur at hinge lines and at the fore and aft ends of a conventional aircraft door. Windows and maintenance access panels also form gaps with the aircraft skin. All gaps on an aircraft must be sealed to reduce aerodynamic drag and turbulence and to prevent dirt and contaminants from entering the aircraft. In military applications, the gaps must also be sealed to reduce electromagnetic emissions and backscattering and turbulence which contribute to the radar cross-section and acoustic signature of the aircraft. Also, the seal for gaps requires time-consuming and costly maintenance. Hence, there is a need to reduce or minimize the running length of gaps on the aircraft to improve aerodynamic drag and radar cross-section during flight as well as to reduce maintenance time in the hanger. Further, there is a need to reduce or minimize the number of gaps for moveable aircraft members, such as doors, preferably to at least one gap for such members.

Elastomeric transition panels are used to seal gaps or apertures associated with various moveable aircraft members such as access doors, access panels and aperture windows. In stowed position, there are dimensional changes in the size and shape of the doors which, in turn, cause dimensional changes in the gaps, due to the large strains and temperature variations modern aircraft encounter during flight. Strains on the order of 20% to 30% may be encountered for door hinge line and door-to-door gaps. Elastomeric transition panels are designed to be elastic to adjust to these strain-induced and thermal-induced dimensional changes. As aircraft doors are deployed, these gaps expand even more dramatically. A prior art elastomeric transition panel that uses continuous moldline technology (CMT) is disclosed in U.S. Pat. No. 5,222,699 to Albach.

Therefore, there exists a need for a conformal aircraft bay having access doors and panels which close to form a single gap or aperture which are sealed by elastomeric transition panels.

SUMMARY OF THE INVENTION

A single aperture conformal aircraft bay of this invention that overcomes these and other needs is disclosed herein. In accordance with one aspect of the present invention, an aircraft having a conformal aircraft bay is provided in which a cavity forms a bay. A pair of doors attached to the bay, each door having a perimeter with abutting edge portions being located side-by-side while the doors are in a closed position, the doors are structured to open to access the bay with the abutting edge portions moving apart from each other, and each door having an elastomeric transition that is attached to a skin of the aircraft and terminates at the abutting edge portions, the elastomeric transition closing any gaps between the abutting edge portions when the doors are closed.

In accordance with another aspect of this invention, the abutting edge portions engage to seal against each other and extend in a straight line, when the doors are in the closed position. The door portions are joined by a hinge foldable relative to each other along the hinge and are pivotably connected to the bay to open substantially into the bay. The doors may also be opened by sliding substantially laterally apart from each other.

DETAILED DESCRIPTION OF PREFERRED EMBODIMENTS

Figure 1:
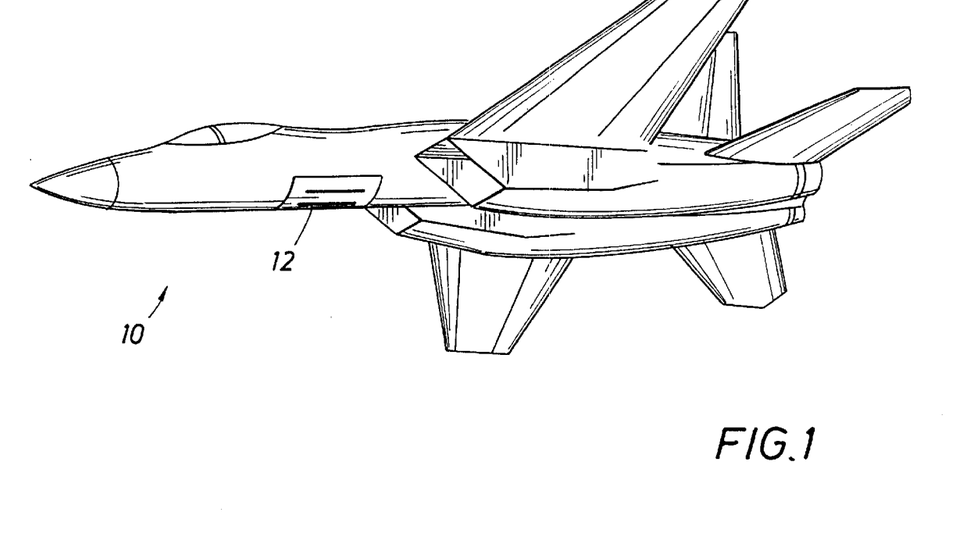
FIG. 1 is a bottom, right perspective view of an aircraft having a conformal aircraft bay in accordance with this invention installed thereon.

In the accompanying drawings, like or corresponding parts or structures are designated by the same reference number. Referring now to FIG. 1, a bottom, right perspective view of aircraft 10 is shown having a conformal aircraft bay of this invention installed thereon. Aircraft 10 may be a military, civilian or commercial aircraft. In one embodiment, bay 12 is shown installed on the fuselage of aircraft 10. The conformal bay of this invention may be employed as a weapons bay, a landing gear bay, a cargo bay, an access bay or the like.

Figure 2:
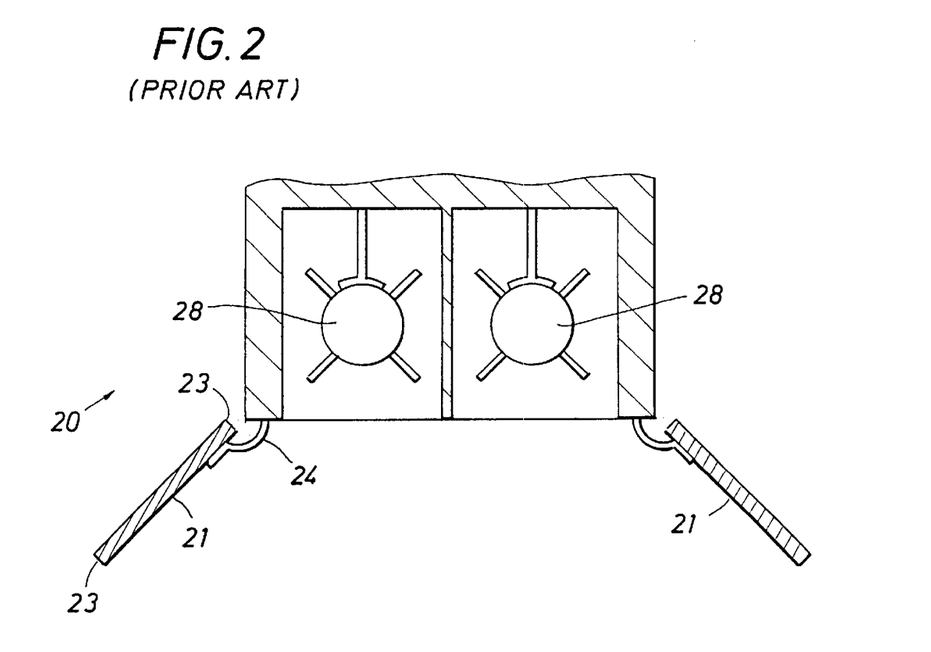
FIG. 2 is a front, cross-sectional view of a prior art aircraft weapons bay having a pair of doors in the opened position.
Figure 3:
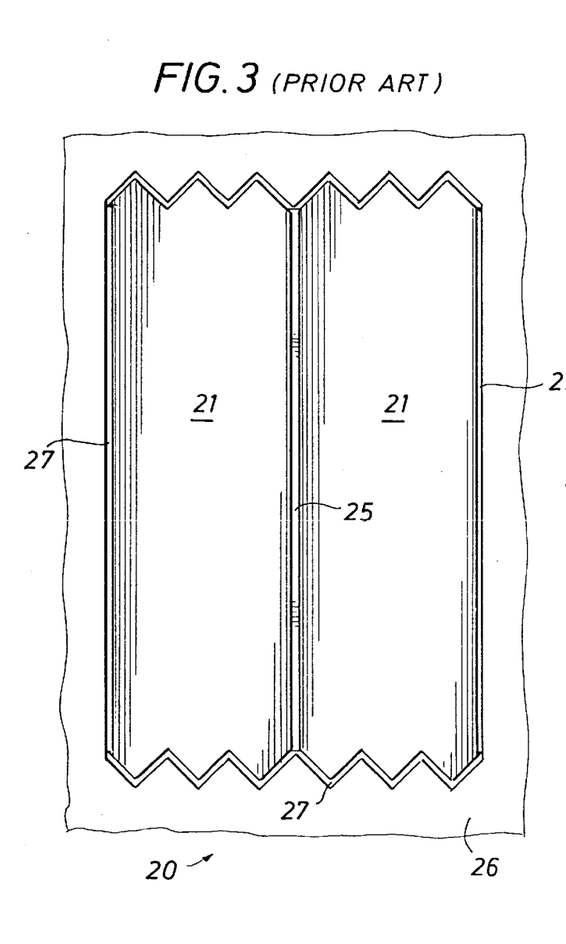
FIG. 3 is a bottom view of FIG. 2 wherein the doors are in the closed position.
Figure 4:
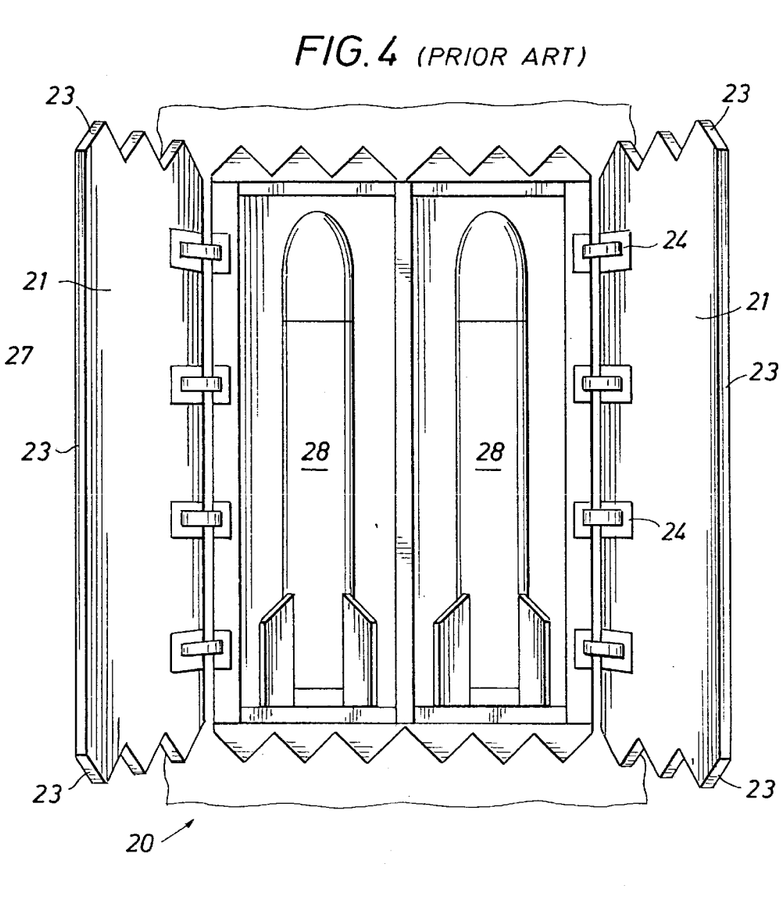
FIG. 4 is a bottom view of the prior art aircraft weapons bay of FIG. 2 wherein the doors in the opened position.

As shown in FIGS. 2–4, a prior art aircraft weapons bay 20 has a pair of doors 21 which are structured to open outwardly away from the aircraft to release one or more weapons 28. Doors 21 cause great wind resistance when opened during flight. Each door 21 is connected by a plurality of hinges 24 to a structural member of aircraft 10. Each door 21 has four edges 23. Gap 25 is formed between edges 23 of adjacent doors 21. Gap 27 is formed between each edge 23 and skin 26 of each door 21. The fore and aft edges of door 21 may be serrated to eliminate straight gaps perpendicular to the direction of flight. As can be seen, the prior art doors have a plurality of gaps, such as gaps 25, 27, that must be sealed with an elastomeric transition or the like.

Figure 5:
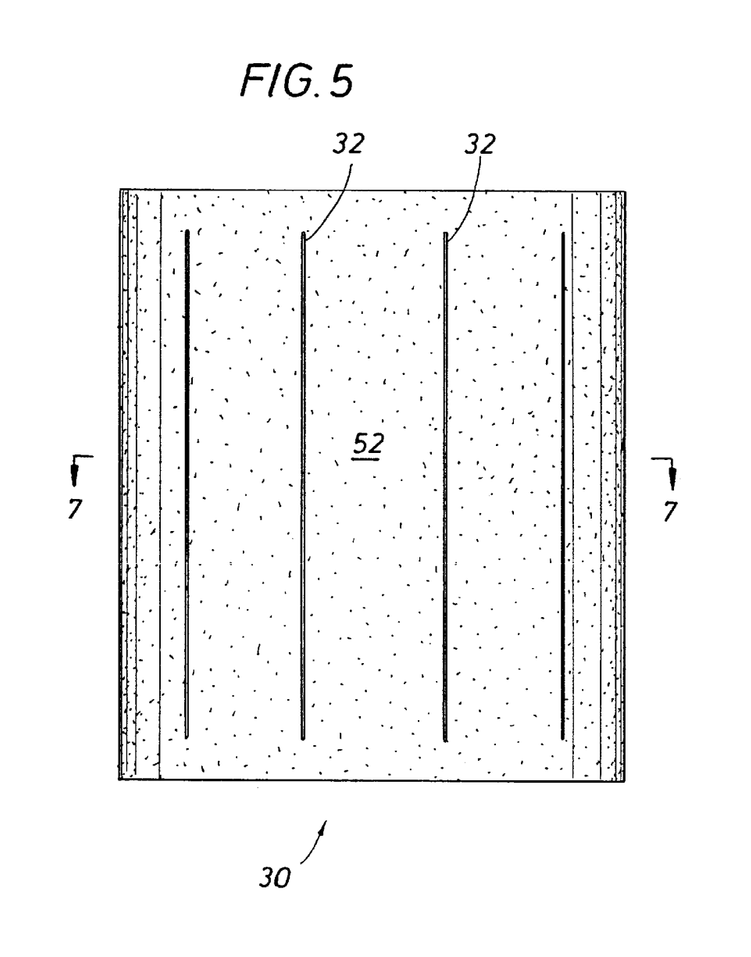
FIG. 5 is a bottom view of a preferred embodiment of a conformal aircraft bay having elastomeric doors in the closed position constructed in accordance with this invention.
Figure 6:
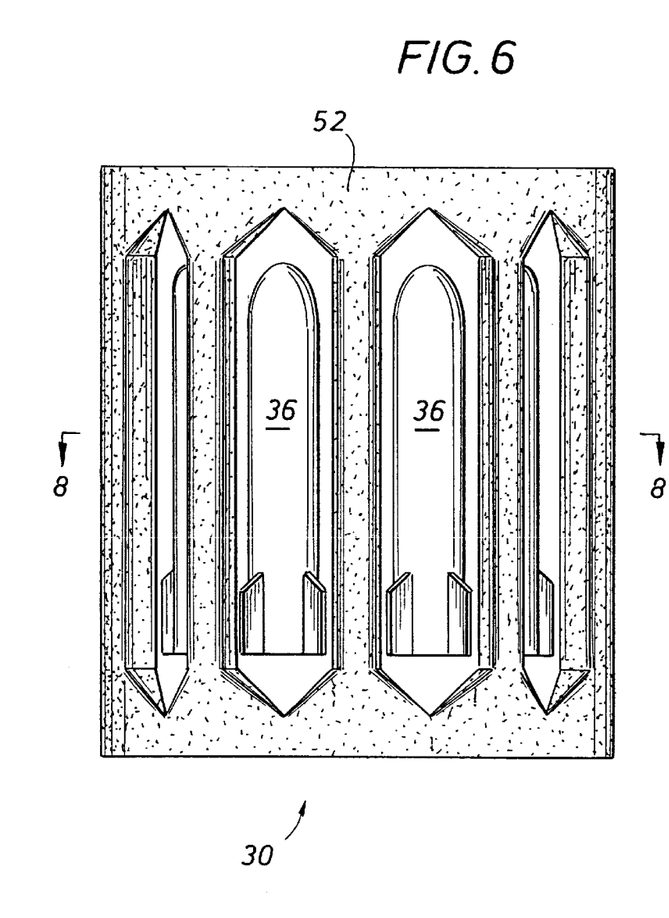
FIG. 6 is a bottom view of the conformal aircraft bay of FIG. 5 having elastomeric doors in the opened position.

The conformal aircraft bay of this invention, however, forms a single gap or slit between bay doors when they closed. In a preferred embodiment, conformal aircraft bay 30 is a weapons bay and has a single gap 32 between each pair of doors, as shown in FIGS. 5–10. Bay 30 is formed by elastomeric transition 52 that extends over and substantially encloses cavity 50 in skin 51 of aircraft 10. Elastomeric transition 52 is a flexible, stretchable skin element that is bonded to skin 51 and covers the bay door. When the bay doors are closed, elastomeric transition 52 seals and closes gap 32. Elastomeric transition 52 is attached to skin 51 on each end of bay 30. Bay 30 is subdivided into a plurality of compartments by one or more keels 56, such as compartments 53, 54. Each compartment 53, 54 may have a weapon 36 and a weapons launching system 37. Compartments 53, 54 are enclosed by a pair of bi-fold doors having a perimeter with abutting edge portions attached to elastomeric transition 52. These doors may also be tri-fold or multi-fold doors. As shown in FIG. 5, gap 32 runs along a straight line parallel with the longitudinal axis of the aircraft and is sealed by elastomeric transition 52. Bay 30 provides a conformal shape for reduced resistance to air flow as compared to prior art doors 21.

Figure 7:
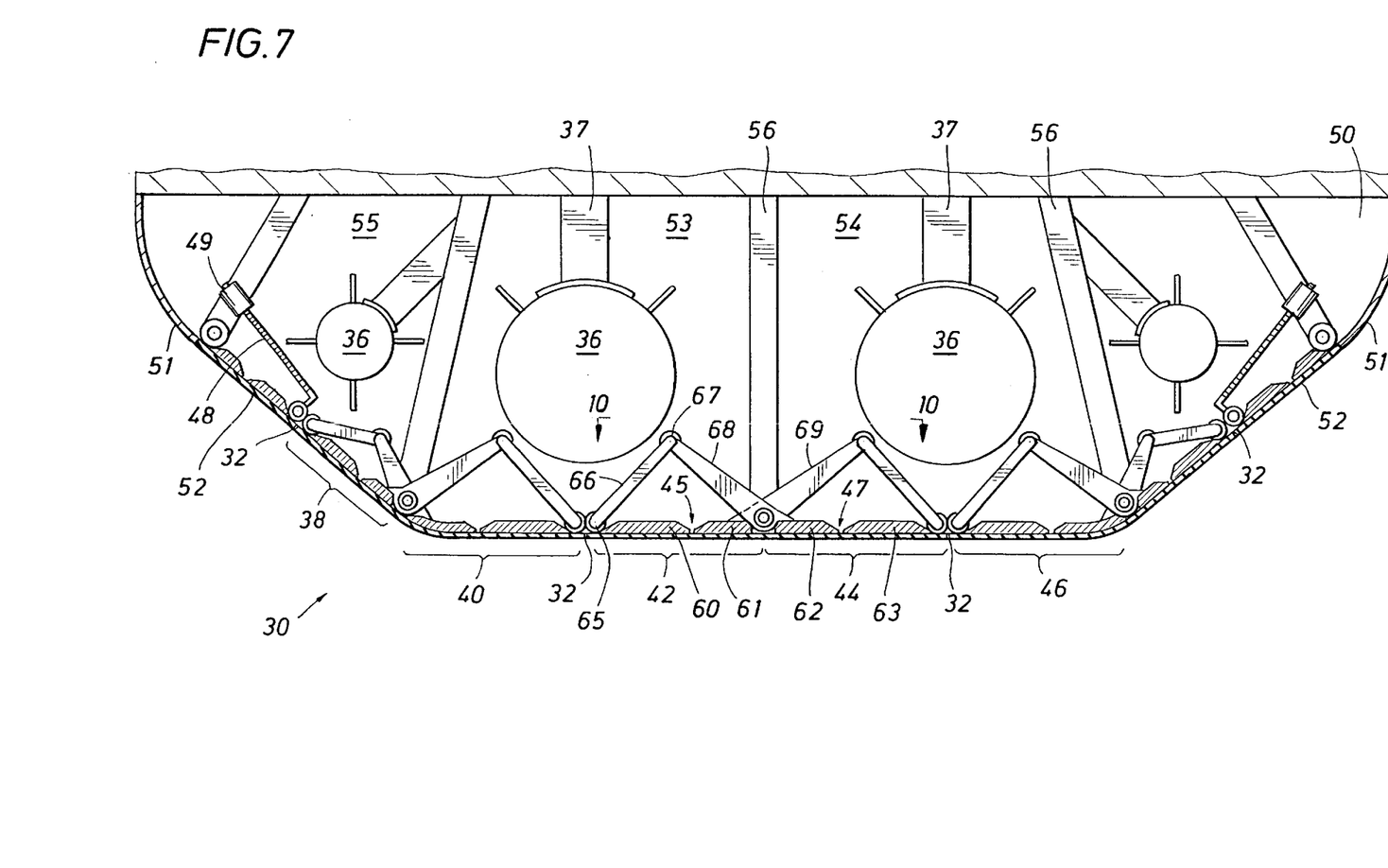
FIG. 7 is a front, cross-sectional view of the aircraft bay of FIG. 5, taken along the line 7—7 of FIG. 5.
Figure 8:
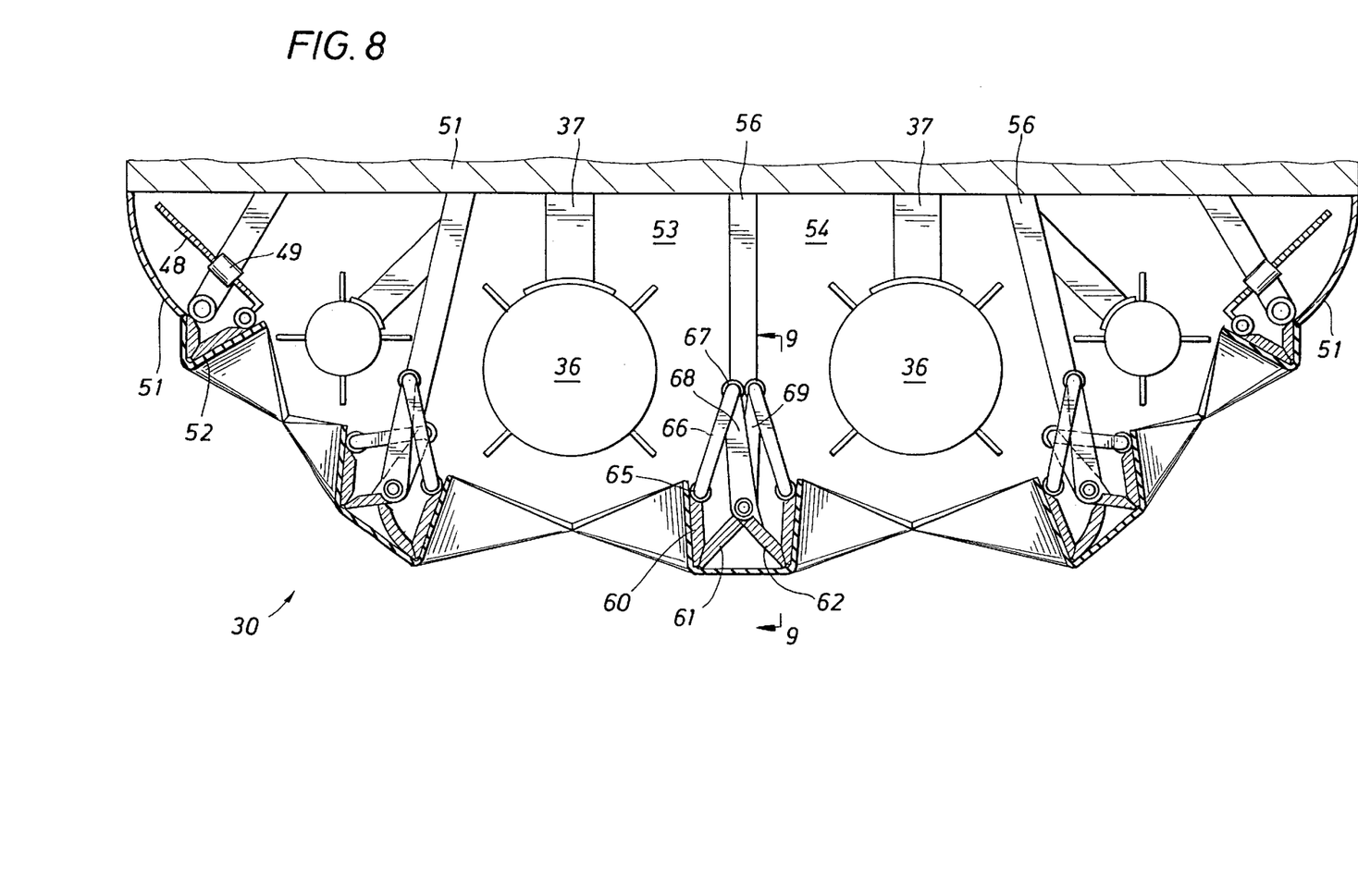
FIG. 8 is a front, cross-sectional view of the conformal aircraft bay of FIG. 6, taken along the line 8—8 of FIG. 6.

The bay doors are shown in the closed position in FIG. 7 and in the opened position in FIG. 8. Doors 40, 42 enclose compartment 53 and form a single gap 32 when doors 40,42 are closed. Door 42 is located on the right portion of compartment 53. Door 42 is a bi-fold door having a primary door panel 61 connected at a hinge point 45 to a secondary door panel 60. Hinge point 45 is a typical hinged joint. Door 44 is located on the left portion of compartment 54, adjacent to compartment 53. Door 44 is also is a bi-fold door having a primary door panel 62 connected at a hinge point 47 to secondary door panel 63. Hinge point 47 is also atypical hinged joint. Hinge point 45 functions as a hinge between panels 60, 61 of door 42. Similarly, hinge point 47 functions as a hinge between panels 62, 63 of door 44. Elastomeric transition 52 is a continuous span from the left side of the panel 60, to the right side of panel 63, where it is fixed to the panel edges by conventional means, such as fasteners or adhesives. Elastomeric transition 52 is slidably attached everywhere else to panels 60, 61, 62 and 63 and bridges across hinge points 45 and 47.

The door panels are connected to one or more adjacently spaced door linkage mechanisms for deforming the elastomeric transition. These door mechanisms are operated by drive means for opening and closing the doors. For door 42, two door linkage mechanisms connect panels 60, 61 to drive means. Door 42 is hingedly connected to trailing arm 66 and leading arm 68 via pin 67 and pin 65. The words "trailing" and "leading" referred to herein refer to the proximity of arms 66, 68 to keel 56 while in the opened position. Pin 67 may be a hinge pin or a clevis pin. Panel 60 is connected to trailing arm 66 via conventional means, such as pin 65. Alternatively, panel 60 may be connected by jack screw 48 and associated nut 49, as shown in compartment 55 of FIG. 7. Leading arm 68 is rigidly connected to panel 62 of door 44 on shaft 70 at a fixed angle of about 120 degrees by conventional means, such as a woodruff key. Hub 72 and a washer (not shown) stabilize arm 68 and panel 62 on shaft 70. Shaft 70 is rotated by drive means to open and close the bay doors, as discussed below. Other door linkage mechanisms are similarly structured.

Figure 9:
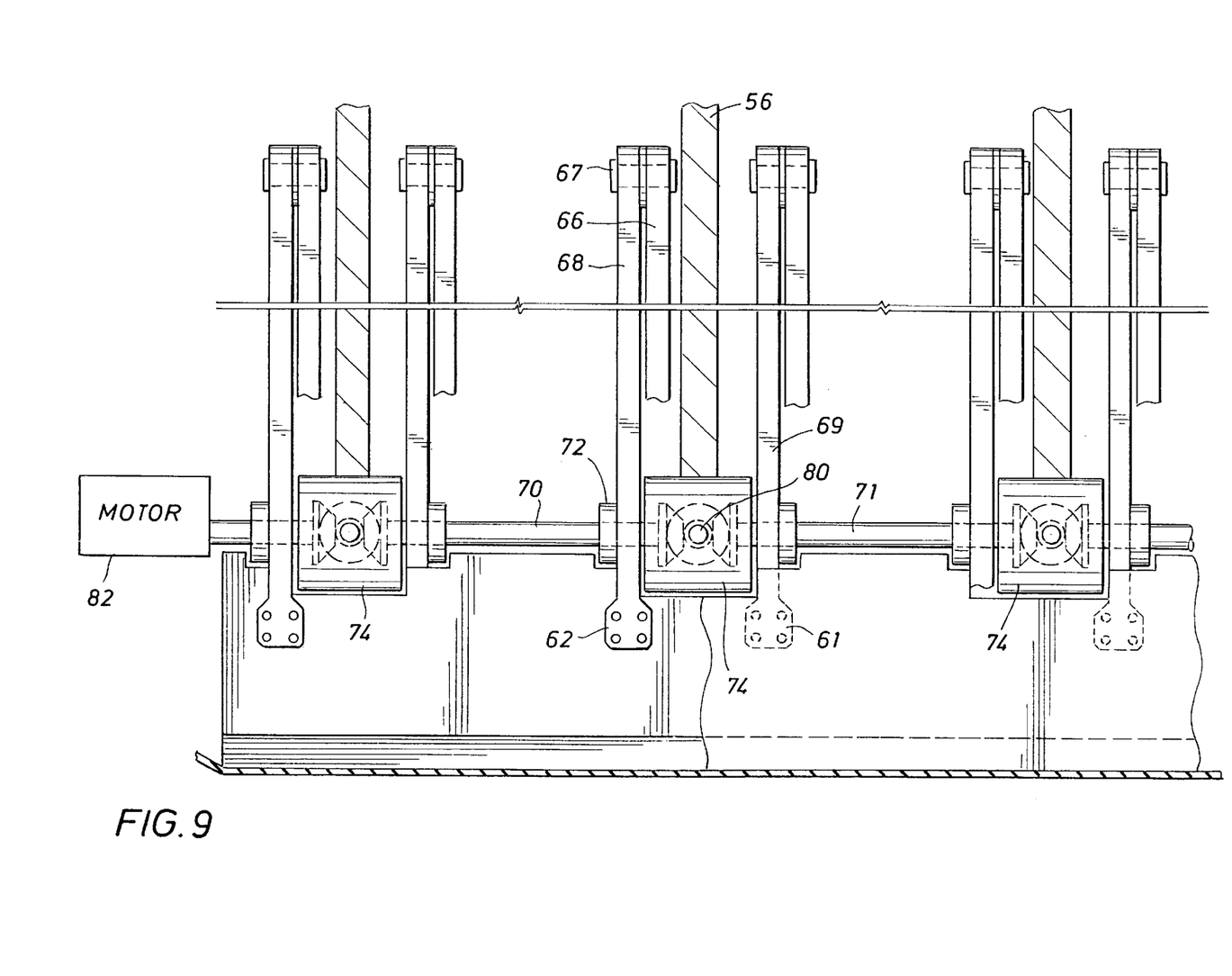
FIG. 9 is a partial view of the conformal aircraft bay of FIG. 6, taken along line 9—9 of FIG. 8.
Figure 10:
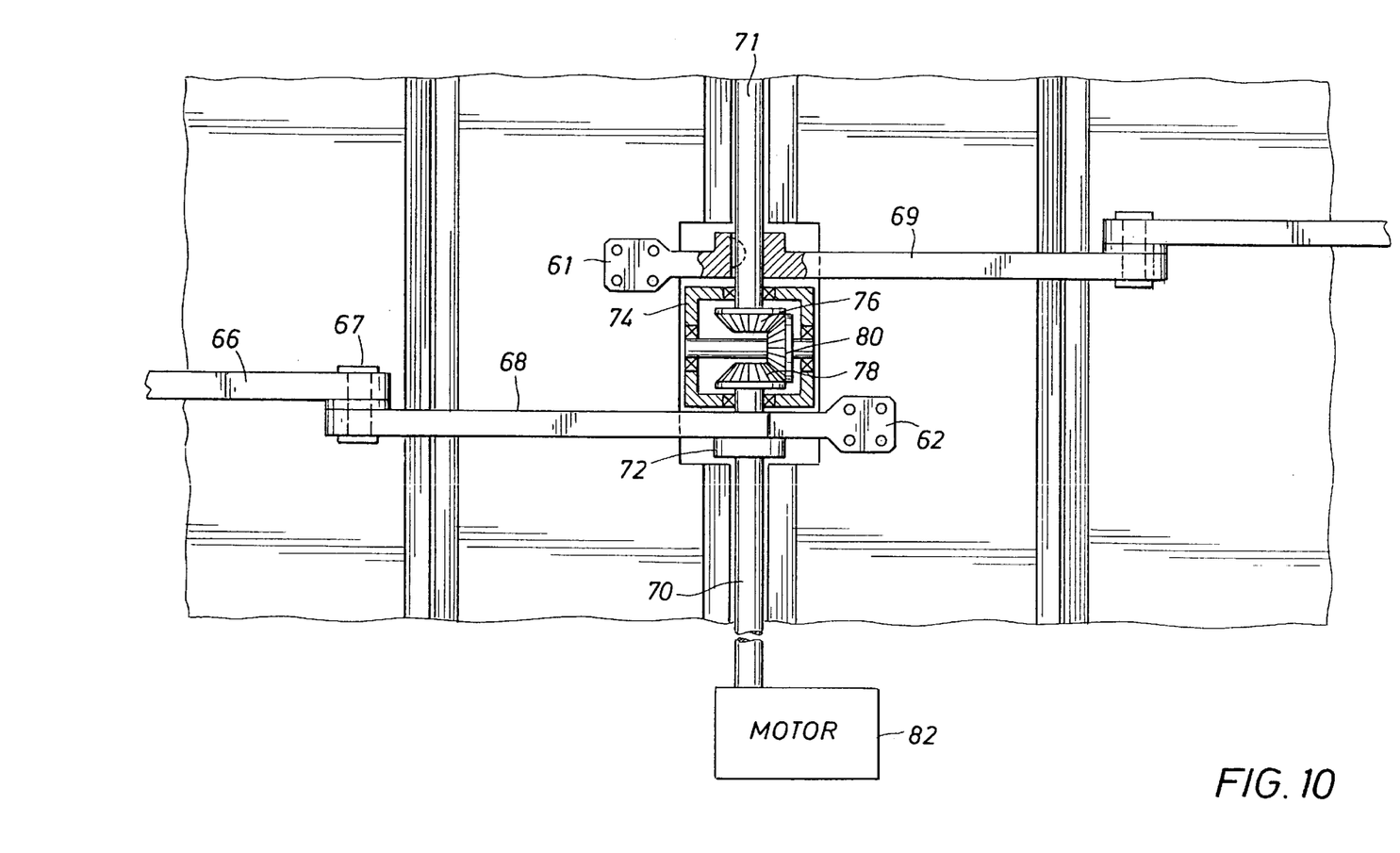
FIG. 10 is a partial view of the conformal aircraft bay of FIG. 5, taken along line 10—10 of FIG. 7.

The details of the drive means for opening and closing the bay doors are shown in FIGS. 9–10. The drive means include motor 82, such as an electric motor, that is connected to shaft 70 and gearbox 74. Gearbox 74 includes drive gears 76, 78 which rotate an idle shaft 80 which, in turn, rotates shaft 71 simultaneously in one direction and shaft 70 in the opposite direction. Shaft 71 is connected to an adjacent door linkage mechanism, as described above. The drive means applies an opening force to door linkage mechanisms to deform and pull apart portions of the slit or gap along the elastomeric transition 52. As the doors open and close the elastomeric transition 52 stretches or contracts and slides along the top surfaces of panels 60, 61, 62 and 63. In this embodiment, the elastomeric transition 52 is at rest when the doors 42, 44 are in the opened position. The elastomeric transition 52 is pulled into tension when doors 42, 44 are in the closed position.

The doors of bay 30 open inwardly into cavity 50, as shown in FIG. 8. A pair of doors at each keel 56 operate in tandem to open the compartments. Door 42 operates in tandem with door 44. Door 40 operates in tandem with door 38. As a result, a total of four (4) doors must be opened, namely doors 38, 40, 42, and 44, to open compartment 53 of bay 30. This means that multiple compartments must open to provide access to one complete compartment. That is, compartments 53, 54 and 55 must open for total access to compartment 53.

In operation, motor 82 rotates shaft 70 via one or more gearboxes 74. Gear 78 attached to a distal end of shaft 70 rotates idle shaft 80 that, in turn, rotates gears 76 on a distal end of shaft 71. As a result, motor 82 rotates shafts 70, 71 in counter rotation via gearbox 74. Rotation of shaft 70, in turn, rotates leading arm 68 for door 42 in a clockwise direction towards keel 56. Panel 62 of door 44 that is rigidly connected to leading arm 68 also rotates in a clockwise direction away from keel 56 and bay 30. Trailing arm 66 is urged towards keel 56 by rotation of leading arm 68 via pin 67. Panel 60 is opened inwardly towards keel 56 by trailing arm 66. Similarly, shaft 71 rotates leading arm 69 and panel 61 of door 44 in a counter-clockwise direction. Leading arm 69 rotates towards keel 56 and panel 61 rotates away from keel 56 and bay 30, because rigid arm 69 and panel 61 are rigidly connected at a fixed angle. As a result, panels 60, 61 are rotated around a hinge point 45 to open door 42 inwardly into cavity 50. Panels 62, 63 are rotated about hinge point 47 to open door 44 inwardly into cavity 50. Doors 38, 40 operate in a similar manner to open to the left side of compartment 53 and the right side of compartment 55.

Figure 11:
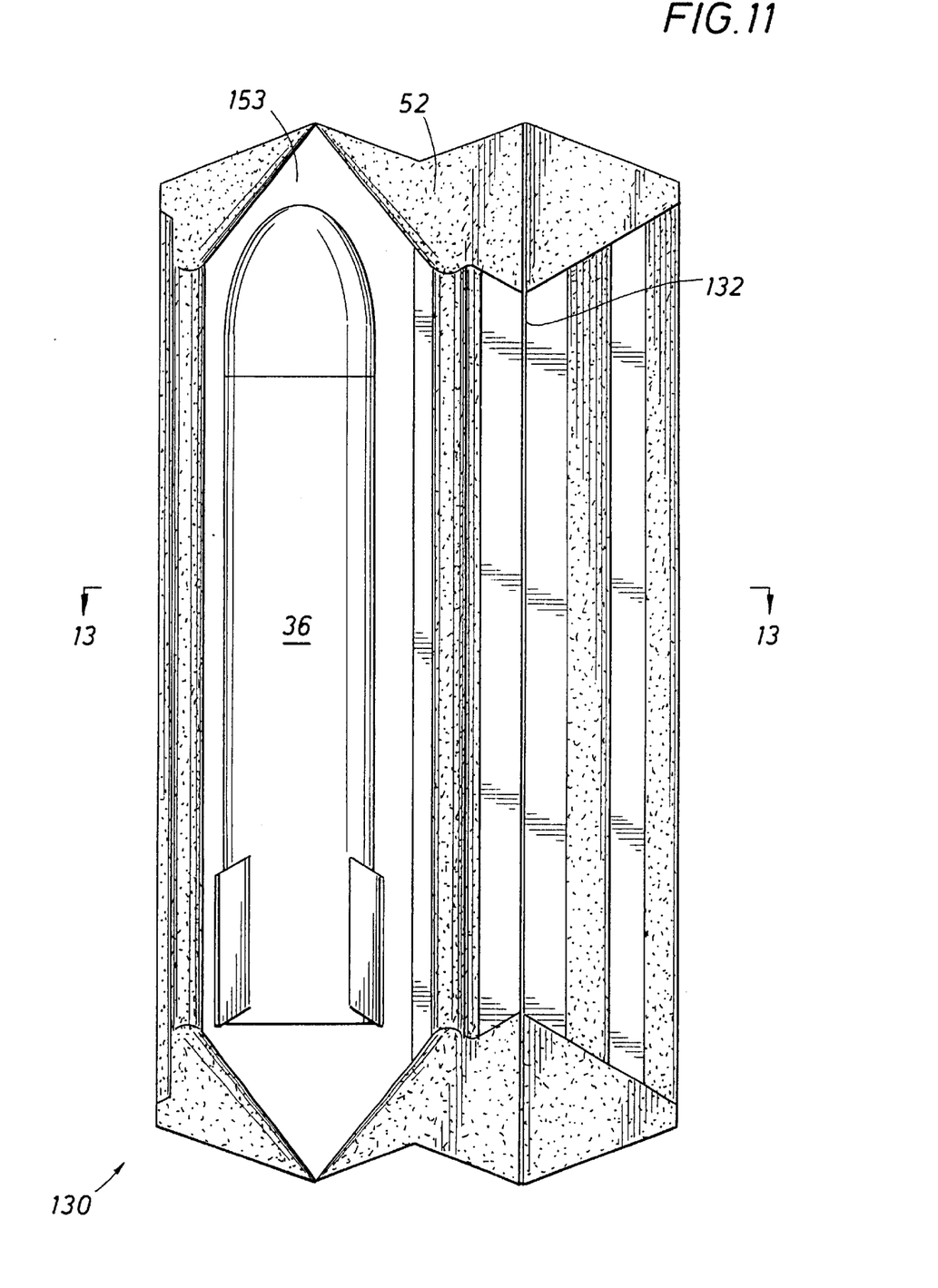
FIG. 11 is a bottom view of a second preferred embodiment of a conformal aircraft bay having doors with elastomeric and rigid sections constructed in accordance with this invention.
Figure 12:
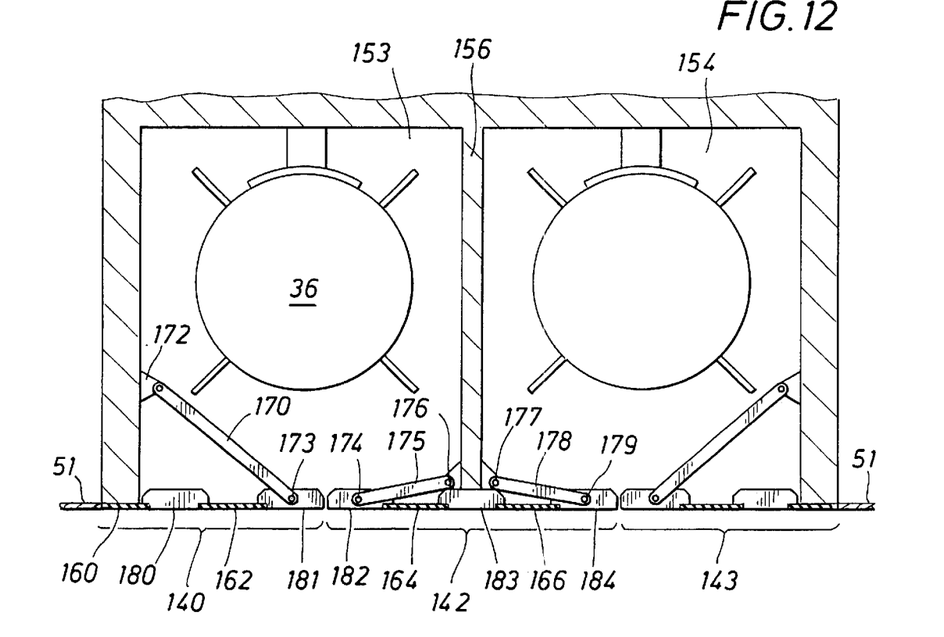
FIG. 12 is a partial front, cross-sectional view of the conformal aircraft bay of FIG. 11 having the doors in the closed position in each bay.
Figure 13:
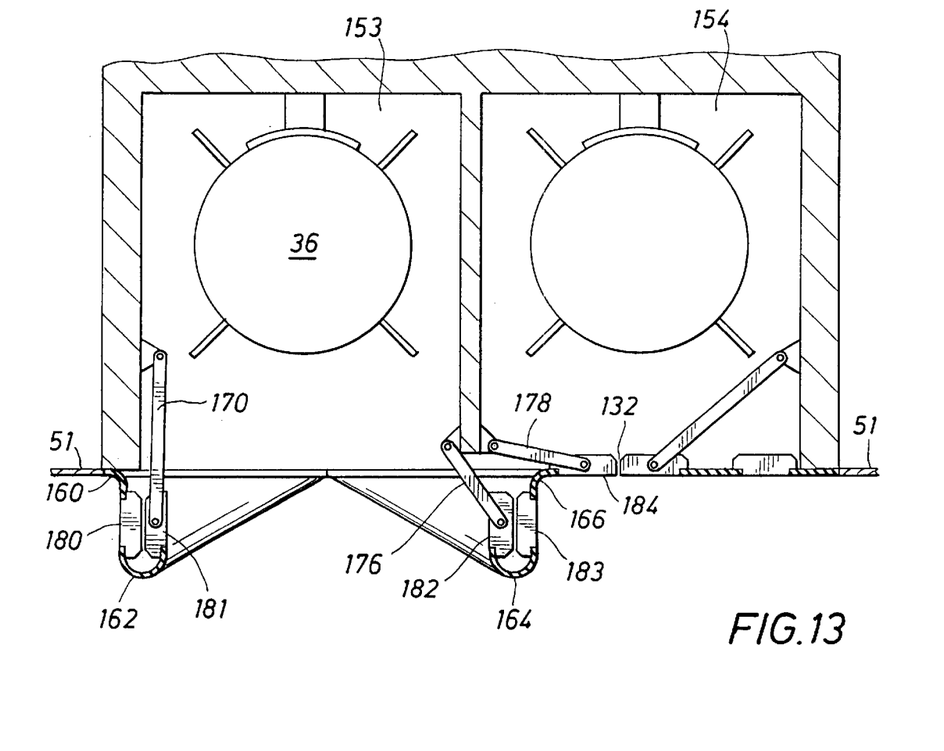
FIG. 13 is a partial, front, cross-sectional view of the conformal aircraft bay of FIG. 11, taken along the line 13—13 of FIG. 11.

FIGS. 11–13 show a second preferred embodiment of the conformal aircraft bay of this invention wherein the bay doors are structured to open by sliding laterally apart. In this embodiment, the elastomeric transition is relaxed when the doors are closed. As the doors open, the elastomeric transitions are put into tension. In FIG. 11, bay 130 is subdivided by keel 156 into two compartments, compartments 153, 154. Compartment 153 is shown in the opened position with weapon 36 installed therein. Compartment 154 is shown in the closed position with gap 132 between the doors.

Bay 130 has a set of three doors, doors 140, 142, 143, each door having elastomeric and rigid panels. These doors are operated by door mechanisms for deforming the elastomeric transition. As shown in FIG. 12, bay 130 has door 140 on the left portion of compartment 153. Door 140 has a first elastomeric transition panel 160 that is secured to skin 51 of aircraft 10 and connected to first rigid panel 180. Second elastomeric transition panel 162 is connected to first rigid panel 180 on the left and second rigid panel 181 on the right. Second rigid panel 181 is hingedly connected to arm 170 by pin 173. Arm 170 is hingedly connected to bay 130 by conventional means, such as hinge pin 172. Arm 170 is operably connected to and rotated by drive means (not shown) that is known in the art. Door 142 is attached to keel 156 and extends over the right side compartment 153 and the left side of compartment 154. Door 142 has center rigid panel 183 that is connected on each end to first center elastomeric transition panel 164 and second center elastomeric panel 166. First center elastomeric transition panel 164 is connected to first end rigid panel 182. Second center elastomeric transition panel 166 is connected to second end rigid panel 184. End rigid panels 182, 184 are hingedly connected to arms 175, 177 by pins, 174,179, respectively. Arms 175, 177 are operably connected to and rotated by drive means (not shown), noted above. Door 143 is on the right portion of bay 154 and is structured similarly to door 140.

As shown in FIG. 13, doors 140, 142 of compartment 153 bi-fold open by sliding substantially laterally apart. In operation, door 140 is opened when drive means rotate arm 170 in a clockwise direction. Arm 170 slides second rigid panel 181 towards first rigid panel 180 by bending first and second elastomeric panels 160, 162. The left portion of door 142 is opened when drive means rotates arm 176 in a counter-clockwise direction. Arm 176 slides first end rigid member rigid member 182 towards second end rigid member 183 by bending center elastomeric sections 164, 166. While drive means rotates arm 176, arm 178 and second end rigid panel 184 remain stationary. As such, door 142 and door 143 are structured in combination to open compartment 153 while compartment 154 remains closed and maintains the seal for gap 132. Compartment 154 is opened in a similar manner. Only one compartment 153, 154 may be opened at one time.

To further stabilize the elastomeric panels while opening and closing the doors, additional door linkage mechanism may be connected to rigid members (not shown). For example, second elastomeric transition panel 162 may be stabilized by a six-bar or multi-bar linkage between first rigid panel 180 and second rigid panel 181.

The advantages of the invention are as follows. The aircraft door/panel system has a single aperture or gap. The door open profile is thus nominally half that of traditional systems. This design eliminates many linear feet of gaps per door, thereby reducing the maintenance hours required for sealing these gaps. In addition, the reduced door profile will generate lower open door hinge movements and fewer stability and control issues. This will allow for the use of smaller actuators which weigh less and require less power than with conventional bay doors. The elastomeric transitions have thin cross sections and may incorporate reinforcement and flexible cores, leading to reduced weight and in-plane modulus.

The foregoing description of preferred embodiments of the invention has been presented for purposed of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined by the claims set forth below.

We claim:

1. An aircraft having a conformal aircraft bay, comprising:
   a cavity that forms a bay;
   a pair of doors attached to the bay, each door having a perimeter with an abutting edge portion, the abutting edge portions being located side-by-side while the doors are in a closed position, the doors are structured to open to access the bay with the abutting edge portions moving apart from each other, and each door having an elastomeric transition that is attached to a skin of the aircraft and terminates at the abutting edge portions, the elastomeric transition closing any gaps between the abutting edge portions when the doors are closed.

2. The aircraft of claim 1 wherein when the doors are in the closed position, the abutting edge portions engage to seal against each other.

3. The aircraft of claim 1 wherein the abutting edge portion of each of the doors extends in a straight line.

4. The aircraft of claim 1 wherein the doors are pivotably connected to the bay to open substantially into the bay.

5. The aircraft of claim 1 wherein the doors are structured to slide substantially laterally apart from each other.

6. The aircraft of claim 1 wherein each of the doors has two portions that are joined by a hinge foldable relative to each other along the hinge.

7. The aircraft of claim 1 wherein the elastomeric transition defines a smooth uninterrupted surface over both of the doors while the doors are in the closed position, but for a single closed slit that exists at the abutted edge portions.

8. An aircraft having a bay, comprising:
   a stretchable elastomeric transition bonded to a skin of an aircraft, the elastomeric transition extending over and substantially enclosing a cavity that forms a bay;
   a slit in the elastomeric transition adjacent the bay; and
   a pair of door mechanisms for deforming the elastomeric transition, the door mechanism being inside the bay and movable from a closed position wherein the slit is closed to an open position wherein the slit opens to expose the bay.

9. The aircraft of claim 8 wherein the door mechanisms are structured to deform portions of the slit to open substantially inwardly into the bay.

10. The aircraft of claim 8 wherein the door mechanisms are structured to deform portions of the slit to slide substantially laterally apart.

11. The aircraft of claim 8 wherein each door mechanism comprises a bifold door that folds along a hinge line.

12. The aircraft of claim 8 wherein each door mechanism comprises:
   a pair of doors, each door having foldable portions joined by a hinge, the elastomeric transition being joined to the doors;
   a rotatable drive shaft;
   a plurality of arms connected to the shaft for rotation therewith for folding the doors between open and closed positions.

13. An aircraft having a bay, comprising:
- a stretchable elastomeric transition bonded to a skin of an aircraft, the elastomeric transition extending over and substantially enclosing a cavity that forms a bay, the bay having at least a right and a left compartment;
- a plurality of slits, each slit providing access to one of the compartments;
- a pair of doors for each compartment, each door having first and second foldable portions, each joined by a hinge, the elastomeric transition being joined to the doors;
- a rotatable drive shaft having first and second portions that counter rotate relative to each other;
- a right leading arm for the right compartment that is attached to a first shaft portion for rotation therewith, the first foldable portion of the door for the left compartment being rigidly connected to the right leading arm;
- a left leading arm for the left compartment that is attached to a second shaft portion for rotation therewith, the first foldable portion of the door for the right compartment being rigidly connected to the left leading arm;
- a right trailing arm pivotably connected between the right leading arm and the second foldable portion of the right compartment door;
- a left trailing arm pivotably connected between the left leading arm and the second foldable portion of the left compartment door.

14. The aircraft of claim 13 further comprising a gearbox that causes the first and second portions of the shaft to counter rotate, the gearbox located between a first and second portions of the rotatable shaft.

15. An aircraft having a bay, comprising:
- a cavity that forms a bay, the bay having a right and a left compartment divided by a central member;
- a plurality of slits, each slit providing access to one of the compartments;
- a pair of left door portions for the left compartment, the left door portions being joined by an elastomeric transition and foldable relative to each other;
- a pair of right door portions for the right compartment, the right door portions being joined by an elastomeric transition and foldable relative to each other;
- at least two central door portions each connected by an elastomeric transition, the central door portions being foldable relative to each other;
- a left linkage that connects at least one left door portions to the bay;
- a right linkage that connects at least one right door portions to the bay;
- at least two central linkages that connect the central door portions to a central member; and whereby the central linkages and central door portions are structured in combination to open one compartment while the other compartment remains closed.

16. A method of opening and closing a conformal aircraft bay, comprising:
- attaching an elastomeric transition to a skin of the aircraft;
- providing a slit in the elastomeric transition, wherein edges of the slit abut but are not fastened to each other while the elastomeric transition is in a closed position;
- applying an opening force for elastically deforming the elastomeric transition to open the slit for access to the bay, the elastomeric transition being biased to the closed position; and
- removing the opening force, the bias of the elastomeric transition causing the edges of the slit to close against each other to close access to the bay.

17. The method of opening and closing a conformal aircraft bay of claim 16 wherein the applying an opening force step includes moving a portion of the elastomeric transition on each side of the slit outward from the bay.

18. The method of opening and closing a conformal aircraft bay of claim 16 wherein the applying an opening force step includes pulling the edges of the slit apart from each other.

19. The method of opening and closing a conformal aircraft bay of claim 16 wherein the step of providing the slit comprises making the slit linear.

20. A method of opening and closing a conformal aircraft bay, comprising:
- attaching an elastomeric transition to a skin of the aircraft;
- providing a slit in the elastomeric transition;
- applying an opening force for deforming the elastomeric transition to open the slit for access to the bay; and
- removing the opening force and allowing edges of the slit to close about each other to close access to the bay; and wherein
- the applying an opening force step includes drawing a portion of the elastomeric transition on each side of the slit into the bay.

* * * * *